(12) United States Patent
Mitsui

(10) Patent No.: US 9,501,850 B2
(45) Date of Patent: Nov. 22, 2016

(54) DISPLAY TECHNIQUES FOR GRAPHS

(71) Applicant: GLOBALFOUNDRIES INC., Grand Cayman (KY)

(72) Inventor: Kinichi Mitsui, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 273 days.

(21) Appl. No.: 14/335,486

(22) Filed: Jul. 18, 2014

(65) Prior Publication Data
US 2015/0049089 A1 Feb. 19, 2015

(30) Foreign Application Priority Data
Aug. 15, 2013 (JP) .................................. 2013-168834

(51) Int. Cl.
*G06T 11/20* (2006.01)

(52) U.S. Cl.
CPC .................... *G06T 11/206* (2013.01)

(58) Field of Classification Search
None
See application file for complete search history.

(56) References Cited

U.S. PATENT DOCUMENTS

| 5,619,631 A * | 4/1997 | Schott | G06F 3/0481 |
| | | | 345/440 |
| 2007/0136396 A1* | 6/2007 | Kulkarni | G06F 8/71 |
| 2008/0024666 A1* | 1/2008 | Sudo | H04N 5/44543 |
| | | | 348/565 |
| 2011/0234595 A1* | 9/2011 | Poston | G06T 11/20 |
| | | | 345/440 |
| 2014/0292765 A1* | 10/2014 | Maruyama | G06T 11/206 |
| | | | 345/440 |

FOREIGN PATENT DOCUMENTS

| JP | 200726210 A | 2/2007 |
| JP | 2008537221 A | 9/2008 |
| JP | 201294062 A | 5/2012 |
| JP | 2012113614 A | 6/2012 |
| JP | 2012248188 A | 12/2012 |
| JP | 2013513861 A | 4/2013 |

* cited by examiner

*Primary Examiner* — Ryan R Yang
(74) *Attorney, Agent, or Firm* — Michael J. LeStrange, Esq.

(57) ABSTRACT

A display device for displaying a graph structure in which the graph structure has elements. The display device includes a display screen for displaying at least first and second display regions and a display screen processing section configured to display in the first display region at least a part of the graph structure including a first element. The display also includes a control section configured to cause the display screen to display in the second display region, responsive to selection of the first element displayed in the first display region, at least a part of the graph structure including the first element. Additional embodiments include a display method performed by the display device, and a computer program product used in the display device.

20 Claims, 14 Drawing Sheets

DISPLAY TECHNIQUES FOR GRAPHS

CROSS-REFERENCE TO RELATED APPLICATIONS

This application claims priority to Japanese Patent Application No. 2013-168834, filed on Aug. 15, 2013, and all the benefits accruing therefrom under 35 U.S.C. §119, the contents of which in its entirety are herein incorporated by reference.

BACKGROUND

This disclosure relates to a display device, a display method, and a related program for displaying graphs on a computer screen. In conventional computer display technology, a portion of a graph structure is displayed by centering a selected component, such as a node, on the display. When a portion of the displayed graph structure is moved, however, the positional relationship between the previously displayed portion and the currently displayed portion may become unclear making it difficult to grasp the flow of the graph before and after the movement of the portion of the displayed graph structure.

SUMMARY

An embodiment provides a display device for displaying a graph structure in which the graph structure has elements. The display device includes a display screen for displaying at least first and second display regions and a display screen processing section configured to display in the first display region at least a part of the graph structure including a first element. The display also includes a control section configured to cause the display screen to display in the second display region, responsive to selection of the first element displayed in the first display region, at least a part of the graph structure including the first element. Additional embodiments include a display method performed by the display device, and a computer program product used in the display device.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, where the same reference generally refers to the same components in the embodiments of the present disclosure.

DETAILED DESCRIPTION

Figure 1:
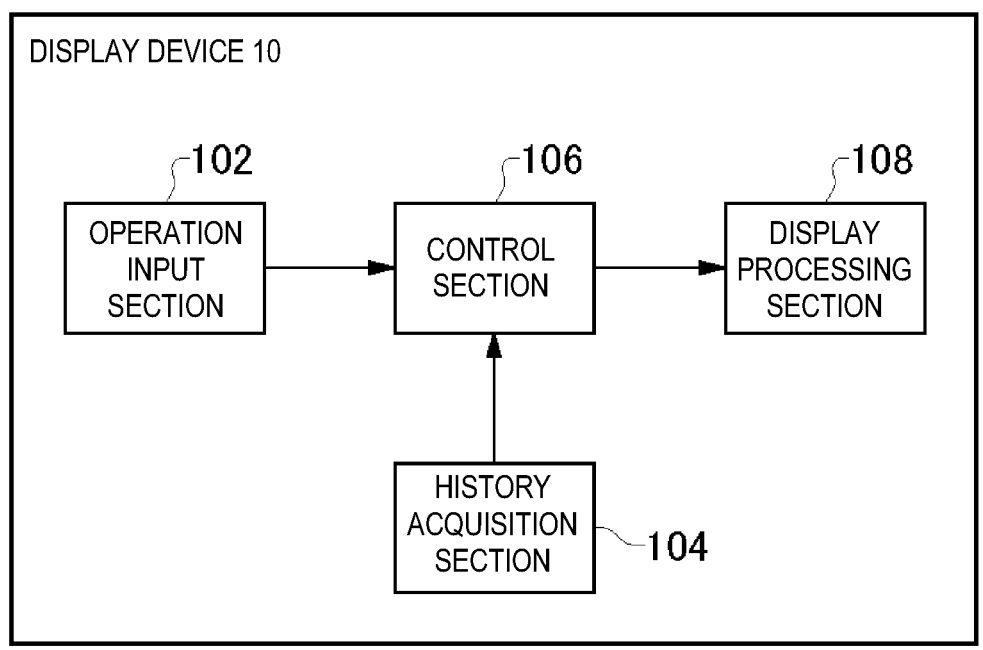
FIG. 1 shows a configuration of a display device 10 of a present embodiment.

Embodiments may be realized in a method, apparatus, and computer program product for displaying graph structures. With reference now to the figures, FIG. 1 shows a configuration of a display device 10 of a present embodiment. The display device 10 displays, in a normal mode and a two screen mode, at least a part of a graph structure (also referred to as a subgraph structure in the present specification) provided with a plurality of nodes and edges, and displays, in the two screen mode, a subgraph structure in a first display region and a second display region of a display screen. (Herein, each node and edge may be referred to as an "element.") The display device 10 is provided with an operation input section 102, a history acquisition section 104, a control section 106, and a display processing section 108.

The operation input section 102 is connected to input devices, such as a mouse, a keyboard, and a touch panel, and receives various kinds of operations from a user. For example, the operation input section 102 receives an operation for selecting an element of a subgraph structure displayed on a display screen, a switching operation for performing switching between the normal mode and the two screen mode, an operation for returning the display of the display screen, and the like. The operation input section 102 supplies the received operation instruction to the control section 106.

The history acquisition section 104 acquires a display history of a subgraph structure displayed on the display screen. For example, the history acquisition section 104 may acquire a display history from a storage device which stores display histories and which is located inside/outside the display device 10. The history acquisition section 104 supplies the acquired history to the control section 106.

The control section 106 acquires elements of an entire graph structure from a storage device located inside/outside the display device 10. According to a display mode received by the operation input section 102, the control section 106 makes the display processing section 108 display, on a display screen, a subgraph structure which is a part of the entire graph structure. For example, the control section 106 displays, in the normal mode, a subgraph structure in a single display region of a display screen, and displays, in the two screen mode, a subgraph structure in each of a first display region and a second display region of a display screen.

In response to selection of one of the elements included in the subgraph structure displayed in the single display region in the normal mode, the control section 106 may display the subgraph structure by moving the subgraph structure to locate the selected element at the center of the single display region. Further, in response to selection of a first element from the elements included in the subgraph structure displayed in the first display region in the two screen mode, the control section 106 may display, in the second display region, at least a part of the subgraph structure including the first element.

Further, in response to a switching operation being inputted into the operation input section 102, the control section 106 makes the display processing section 108 switch the display between the normal mode and the two screen mode. Further, in each of the display modes, the control section 106 displays one or more of history displays of the subgraph structure in a history display region of the display screen.

The display processing section 108 is controlled by the control section 106 and displays a subgraph structure in each display region of the display screen. For example, the display processing section 108 displays a subgraph structure in a single display region in the normal mode, and displays a subgraph structure in each of a first display region and a second display region of the display screen in the two screen mode. Further, the display processing section 108 displays one or more history displays in the history display region of the display screen.

In this way, the display device 10 of the present embodiment displays a subgraph structure in the normal mode and the two screen mode, and performs switching between the normal mode and the two screen mode according to operation by the user. Thereby, according to a user's selection, the display device 10 can display the subgraph structure in the mode which makes the check by the user easier.

Figure 2:
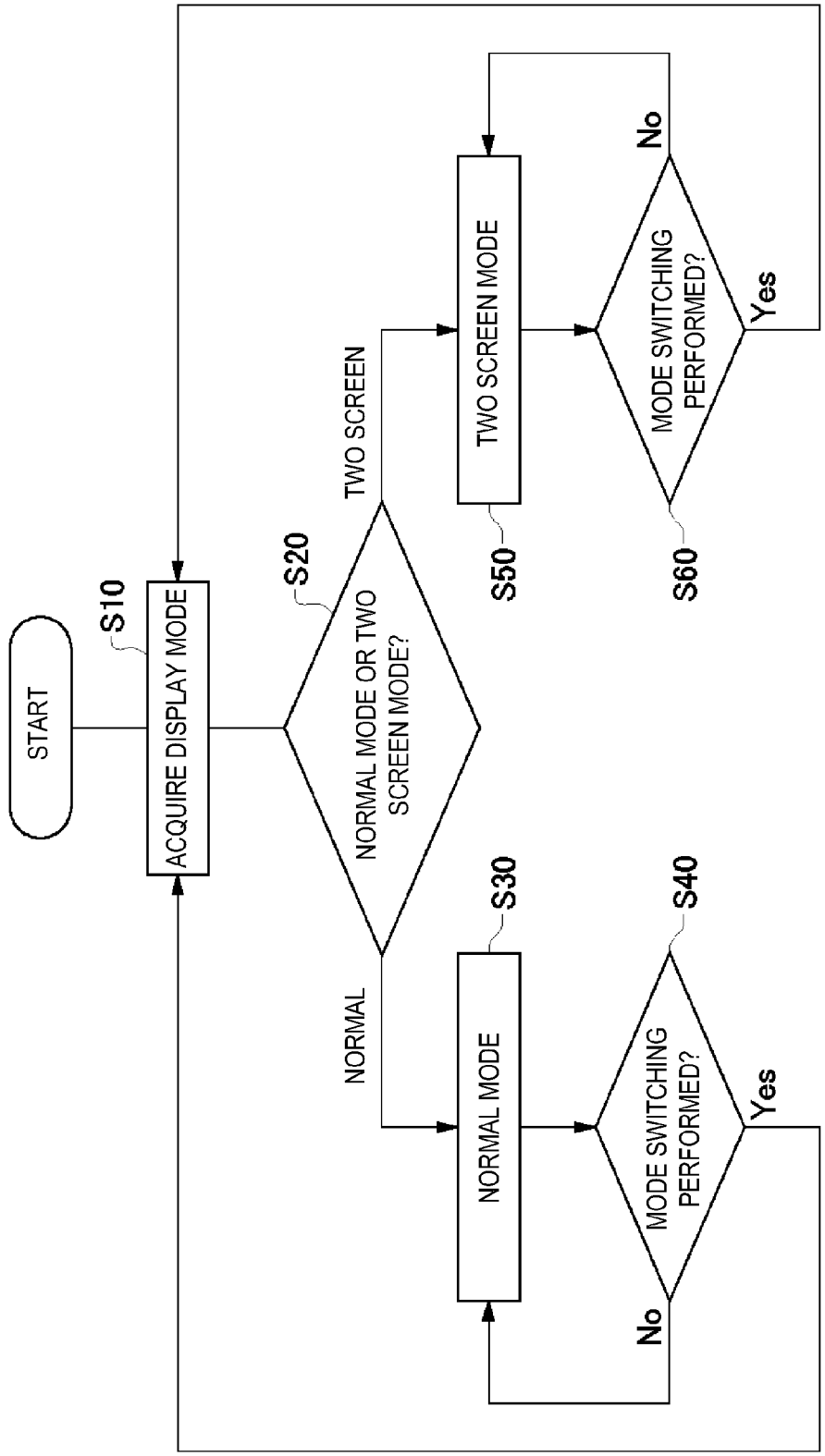
FIG. 2 shows an entire process flow in the display device 10 of the present embodiment.

FIG. 2 shows a process flow of a display method performed by the display device 10 of the present embodiment. In the present embodiment, the display device 10 performs processing of S10 to S60 to display a graph structure.

First, in S10, the control section 106 acquires a display mode inputted into the operation input section 102. When no display mode is inputted immediately after the start of processing, the control section 106 may acquire a predetermined mode of the normal mode and the two screen mode.

Next, in S20, the control section 106 determines whether the display mode acquired in S10 is the normal mode or the two screen mode. When the acquired display mode is the normal mode, the control section 106 advances the processing to S30. When the acquired display mode is the two screen mode, the control section 106 advances the processing to S50.

In S30, the control section 106 makes the display processing section 108 display a subgraph structure on the display screen in the normal mode.

Next, in S40, the control section 106 determines whether or not an operation for switching the display mode is inputted in the operation input section 102. When determining that the operation for switching the display mode is inputted, the control section 106 returns the processing to S10. When determining that the operation for switching the display mode is not inputted, the control section 106 returns the processing to S30 and continues the display in the normal mode.

In S50, the control section 106 makes the display processing section 108 display a subgraph structure on the display screen in the two screen mode.

Next, in S60, the control section 106 determines whether or not an operation for switching the display mode is inputted in the operation input section 102. When determining that the operation for switching the display mode is inputted, the control section 106 returns the processing to S10. When determining that the operation for switching the display mode is not inputted, the control section 106 returns the processing to S50 and continues the display in the two screen mode.

Figure 3:
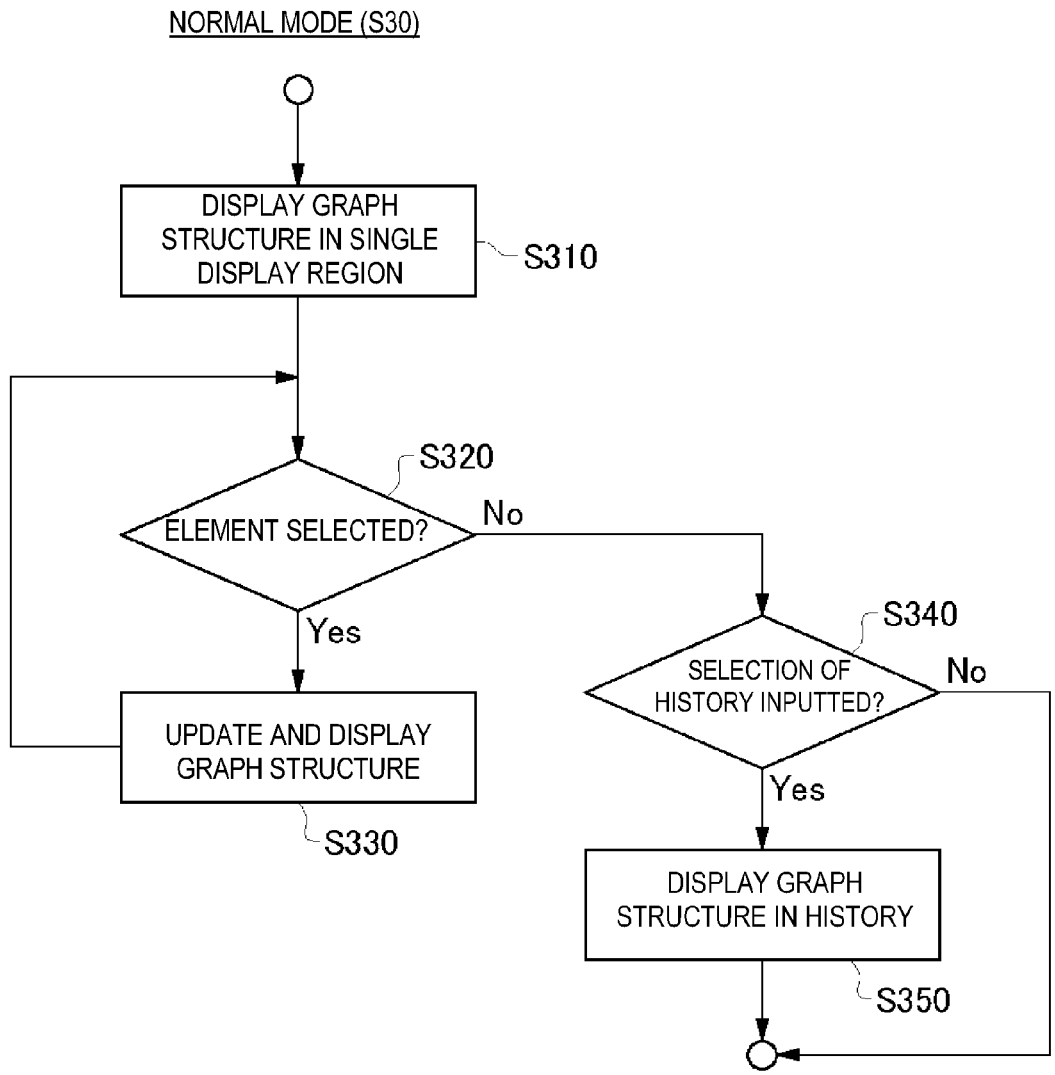
FIG. 3 shows a process flow in a normal mode in the display device 10 of the present embodiment.

FIG. 3 shows a process flow in the normal mode of the display device 10 of the present embodiment. In the processing of S30, the display device 10 executes processing of S310 to S350 to display a subgraph structure.

First, in S310, the control section 106 makes the display processing section 108 display a subgraph structure in a single display region of a display screen. For example, the control section 106 acquires information on all elements configuring an entire graph structure from the storage device provided inside/outside the display device 10, and displays, in a single display region, a subgraph structure which is centered on an element set beforehand or set by the user, and which includes elements located within a predetermined distance from the element set as the center of the subgraph structure.

Here, the distance from an element may be the number of edges in the shortest route between the element and another element. For example, when a node A and a node B are connected to each other by an edge AB, the distance between the node A and the node B may be set as 1. For example, the control section 106 may display, in a single display region, a subgraph structure including, as elements located within the predetermined distance, elements located within a distance of two edges from the element set as the center of the subgraph structure.

By using a model based on physical phenomena of a spring model, and the like, the control section 106 may determine the position of the elements included in the subgraph structure displayed on the display screen. For example, the control section 106 may calculate coordinates of each of the nodes by using a model based on the assumption that physical force, such as attraction/repulsion force of a spring, gravitational force, or electromagnetic force, exists between two or more nodes, and that each of the nodes is moved to a stable position by the physical force between the nodes.

The control section 106 displays a display history in the normal mode in a history display region 180 of the display screen. The control section 106 may store, as a history, a displayed subgraph structure in the storage devices provided inside/outside the display device 10.

Next, in S320, the control section 106 determines whether or not the operation input section 102 receives an operation for selecting an element of the subgraph structure displayed on the single display region. For example, the control section 106 determines whether or not the operation input section 102 receives input of an element which is included in the elements of the subgraph structure displayed in the single display region and which is not the element set as the center of the graph structure. When determining that the element has been selected, the control section 106 advances the processing to S330. When determining that the element has not been selected, the control section 106 advances the processing to S340.

In S330, the control section 106 makes the display processing section 108 update at least a part of the subgraph structure according to the element selected in S320, and display the updated subgraph structure in the single display region of the display screen.

For example, the control section 106 takes the element selected in S320 as the center of a subgraph structure and displays, in the single display region, the subgraph structure which includes elements located within the predetermined distance from the element taken as the center of the subgraph structure. By using a model based on physical phenomena of a spring model, and the like, the control section 106 may determine the position of the elements included in the subgraph structure displayed in the single display region.

The control section 106 additionally displays a display history in the normal mode in the history display region of the display screen. Further, the control section 106 may store, as a history, the displayed subgraph structure in the storage device provided inside/outside the display device 10.

Next, in S340, the control section 106 determines whether or not the operation input section 102 receives an operation for selecting at least a history from the history display region. When determining that a history has been selected, the control section 106 advances the processing to S350. When determining that a history has not been selected, the control section 106 ends the processing.

In S350, the control section 106 makes the display processing section 108 update at least a part of the subgraph structure according to the history selected in S340, and display the updated subgraph structure in the single display region of the display screen. For example, the control section 106 may read, from the storage device storing the histories, the subgraph structure corresponding to the history selected in S350, and display, in the single display region, the subgraph structure corresponding to the history.

Figure 4:
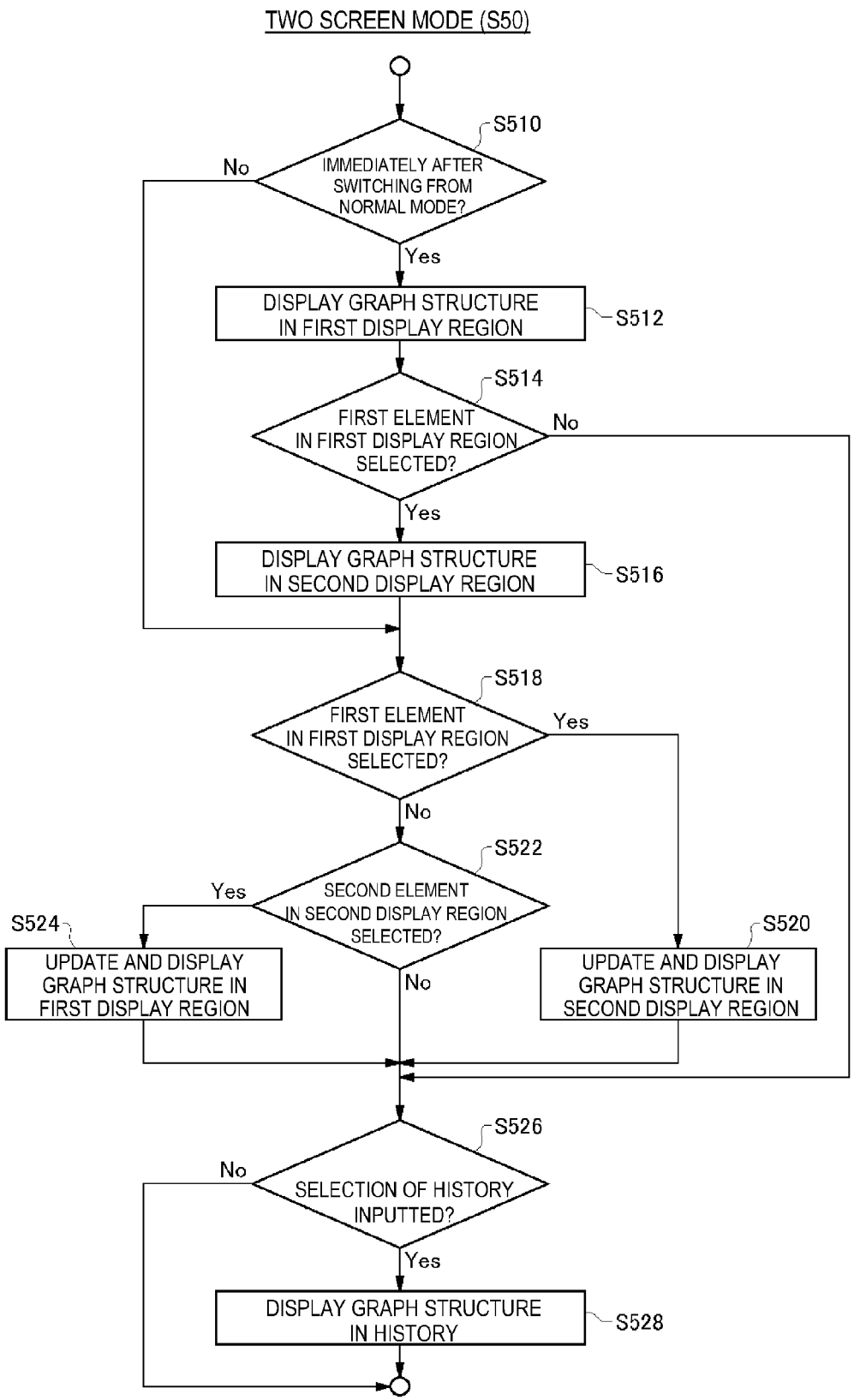
FIG. 4 shows a process flow in a two screen mode in the display device 10 of the present embodiment.

FIG. 4 shows a process flow in the two screen mode of the display device 10 of the present embodiment. In processing of S50, the display device 10 executes processing of S510 to S528 to display a graph structure.

In S510, the control section 106 determines whether or not the current time is immediately after the display mode is switched from the normal mode to the two screen mode. When determining that the current time is immediately after the display mode is switched from the normal mode to the two screen mode, the control section 106 advances the processing to S512. When determining that the current time is not immediately after the display mode is switched from the normal mode to the two screen mode, the control section 106 advances the processing to S518.

First, in S512, the control section 106 makes the display processing section 108 display a subgraph structure in a first display region of a display screen. For example, the control section 106 acquires information on all elements configuring an entire graph structure from the storage device provided inside/outside the display device 10, and displays, in the first display region, a subgraph structure which is centered on an element set beforehand or set by the user, and which includes elements located within a first distance (for example, within a distance of two edges) from the element set as the center of the subgraph structure. Alternatively, the control section 106 may display, in the first display region, a subgraph structure including a predetermined number of elements (for example, 20 elements) provided in order of increasing distance from the element set as the center of the subgraph structure.

By using a model based on physical phenomena of a spring model, and the like, the control section 106 may determine the position of the elements included in the subgraph structure displayed in the first display region.

The control section 106 displays a display history in the two screen mode in a history display region of the display screen. The control section 106 may store, as a history corresponding to the first display region, the subgraph structure displayed in the first display region, in the storage device provided inside/outside the display device 10.

Next, in S514, the control section 106 determines whether or not the operation input section 102 receives an operation for selecting a first element in the subgraph structure displayed in the first display region. For example, the control section 106 determines whether or not the operation input section 102 receives input of a first element which is included in the elements of the subgraph structure displayed in the first display region and which is not the element set as the center of the graph structure. When determining that the first element has been selected, the control section 106 advances the processing to S516. When determining that the first element has not been selected, the control section 106 advances the processing to S526.

In S516, in response to the selection of the first element in the subgraph structure displayed in the first display region, the control section 106 displays, in a second display region, a subgraph structure including the first element. For example, the control section 106 displays, in the second display region, a subgraph structure which is centered on the first element and which includes elements located within a first distance (for example, within a distance of two edges) from the first element. Alternatively, the control section 106 may display, in the second display region, a subgraph structure, which includes a predetermined number of elements (for example, 20 elements) located in order of increasing distance from the first element.

Here, as at least a part of the subgraph structure, the control section 106 may display, in the second display region, elements including the first element and elements not displayed in the first display region. Thereby, the control section 106 can display, in the second display region, a subgraph structure which is adjacent to the subgraph structure displayed in the first display region and which is different from the subgraph structure displayed in the first display region.

As a subgraph structure, the control section 106 may display, in the second display region, the elements displayed in the first display region. In this case, the control section 106 may display, in order of increasing distance from the first element, a predetermined number or less of elements included in the elements displayed in the first display region. Alternatively, the control section 106 may display elements which are included in the elements displayed in the first display region, and which are located within a second distance equal to or less than the first distance (for example, within a distance of one edge) from the first element.

Thereby, the control section 106 can display, in detail in the second display region, a portion which is located in the vicinity of the first element and which is not displayed in the first display region, and also can represent a relationship between the first display region and the second display region by displaying, in the second display region, a minimum number of elements included in the elements displayed in the first display region.

Further, as a subgraph structure, the control section 106 may not display, in the second display region, at least a part of the elements displayed in the first display region. Thereby, the control section 106 can prevent a graph structure overlapping with the graph structure of the first display region from being displayed in the second display region, and thereby can prevent the display of the subgraph structure in the two display regions from becoming redundant.

By using a model based on physical phenomena of a spring model, and the like, the control section 106 may determine the position of the elements included in the subgraph structure displayed in the second display region.

The control section 106 additionally displays a display history in the two screen mode in a history display region of the display screen. The control section 106 may store, as a history corresponding to the second display region, the subgraph structure displayed in the second display region in the storage device provided inside/outside the display device 10.

Next, in S518, the control section 106 determines whether or not the operation input section 102 receives an operation for newly selecting a first element included in the subgraph structure displayed in the first display region. The control section 106 may perform processing similarly to S514. When determining that the first element has been selected, the control section 106 advances the processing to S520. When determining that the first element has not been selected, the control section 106 advances the processing to S522.

In S520, in response to the new selection of the first element included in the subgraph structure displayed in the first display region, the control section 106 displays, in the second display region, a subgraph structure including the new first element. The control section 106 may perform processing for displaying the subgraph structure in the second display region similarly to S516.

The control section 106 updates and displays a display history in the two screen mode in the history display region of the display screen. Further, the control section 106 may store, as a history corresponding to the second display region, the subgraph structure displayed in the second display region in the storage device provided inside/outside the display device 10. The control section 106 advances processing to S526.

Next, in S522, the control section 106 determines whether or not the operation input section 102 receives an operation for selecting a second element included in the subgraph structure displayed in the second display region. For example, the control section 106 determines whether or not the operation input section 102 receives input of a second element which is included in the elements of the subgraph structure displayed in the second display region and which is not the element set as the center of the graph structure. When determining that the second element has been selected, the control section 106 advances the processing to S524. When determining that the second element has not been selected, the control section 106 advances the processing to S526.

In S524, in response to the selection of the second element included in the subgraph structure displayed in the second display region, the control section 106 updates the display of the first display region and displays, in the updated first display region, the subgraph structure including the second element. The control section 106 may perform processing for displaying the subgraph structure in the first display region similarly to the display of the subgraph structure of the second display region in S516.

For example, the control section 106 may display, in the first display region, a subgraph structure which is centered on the second element and which includes elements located within a first distance (for example, within a distance of two edges) from the second element. Alternatively, the control section 106 may display, in the first display region, a subgraph structure, which includes a predetermined number of elements (for example, 20 elements) located in order of increasing distance from the second element.

Here, as at least a part of the subgraph structure, the control section 106 may display, in the first display region, elements including the second element and elements which are not displayed in the second display region. Thereby, the control section 106 can display, in the first display region, a subgraph structure which is adjacent to the subgraph structure displayed in the second display region and which is different from the subgraph structure displayed in the second display region.

As a subgraph structure, the control section 106 may not display, in the first display region, at least a part of the elements displayed in the second display region. Thereby, the control section 106 can prevent a graph structure overlapping with the graph structure of the second display region from being displayed in the first display region, and can prevent the display of the subgraph structure in the two display regions from becoming redundant.

Further, as a subgraph structure, the control section 106 may display, in the first display region, the element displayed in the second display region. In this case, the control section 106 may display, in order of increasing distance from the second element, a predetermined number or less of elements included in the elements displayed in the second display region. Alternatively, the control section 106 may display elements which are included in the elements displayed in the second display region, and which are located within a second distance equal to or less than the first distance (for example, within a distance of one edge) from the second element.

Thereby, the control section 106 can display, in detail in the first display region, a portion which is located in the vicinity of the second element and which is not displayed in the second display region, and also can represent a relationship between the second display region and the first display region by displaying, in the first display region, a minimum number of elements included in the elements displayed in the second display region.

The control section 106 updates and displays a display history in the two screen mode in a history display region of the display screen. Further, the control section 106 may store, as a history corresponding to the first display region, the subgraph structure displayed in the first display region in the storage device provided inside/outside the display device 10. The control section 106 advances processing to S526.

In S526, the control section 106 determines whether or not the operation input section 102 receives an operation for selecting at least a history from the history display region. When determining that a history has been selected, the control section 106 advances the processing to S528. When determining that a history has not been selected, the control section 106 ends the processing.

In S528, the control section 106 makes the display processing section 108 update at least a part of the subgraph structure according to the history selected in S526, and display the updated subgraph structure in the first display region and/or the second display region. For example, the control section 106 may read, from the storage device storing the history, one or two subgraph structures corresponding to the history selected in S526, and display, in the first display region and/or the second display region, the one or two subgraph structures corresponding to the history.

In this way, the display device 10 of the present embodiment performs processing of S10 to S60, processing of S310 to S350, and processing of S510 to S528, and thereby displays a subgraph structure by switching the display mode between the normal mode and the two screen mode.

Especially, in the two screen mode, the display device 10 displays subgraph structures respectively in a first display region and a second display region, and displays a subgraph structure including an element selected in one of the first and second display regions in the other of the first and second display regions. Thereby, the display device 10 simultaneously displays, in a plurality of display regions, a graph structure in which an attention-attracting portion is moved according to an operation, and hence the user can easily grasp the flow of movement of the attention-attracting portion.

Further, in the display device 10 of the present embodiment, the control section 106 calculates the positions of elements at the time of displaying or updating a subgraph structure in each of a single display region 110, a first display region 120, and a second display region 130. Thereby, the control section 106 can arrange and display each of the elements of the subgraph structure at an optimum position in each of the display regions.

Figure 5:
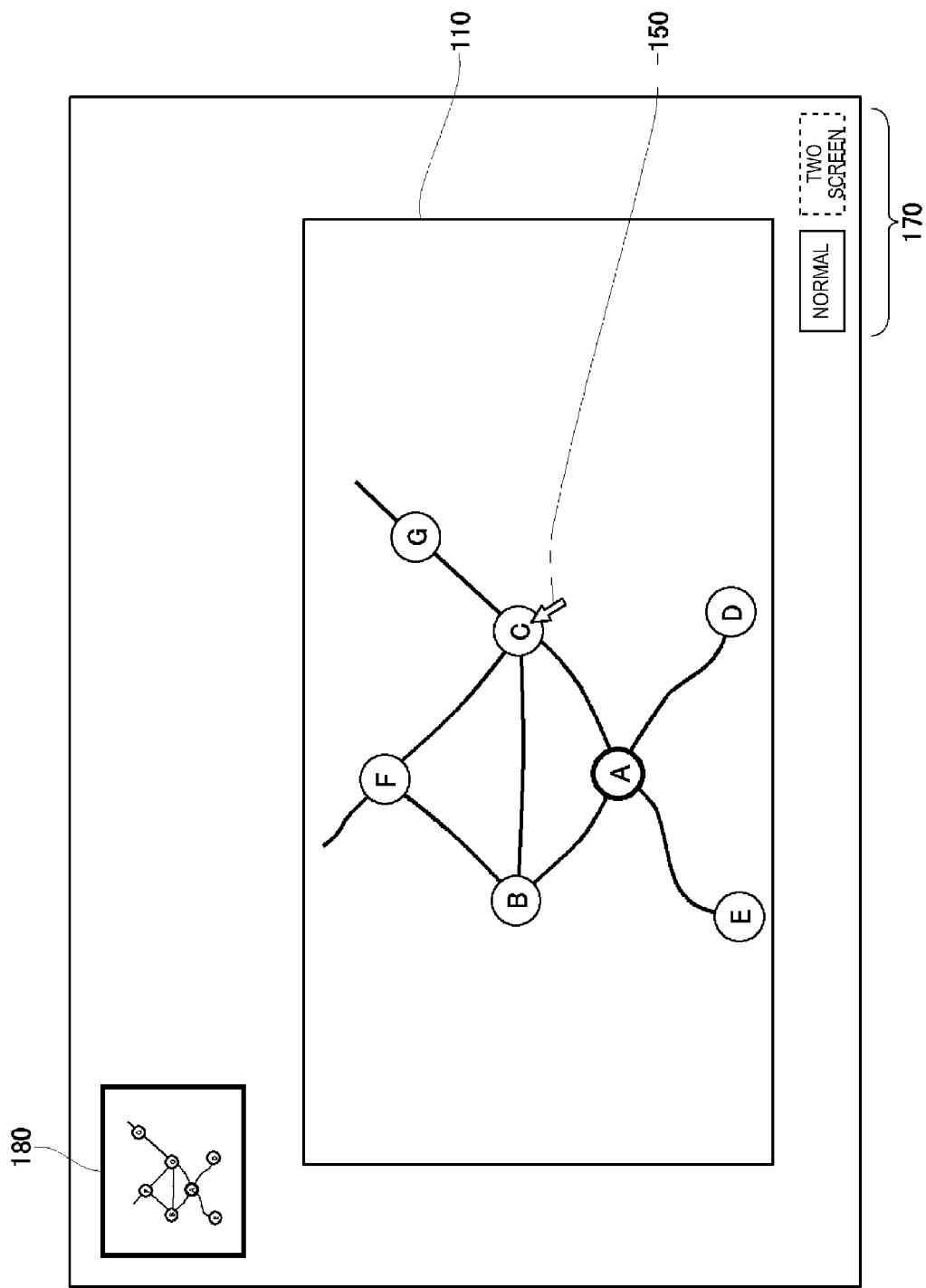
FIG. 5 shows an example of a subgraph structure displayed in S310 of the present embodiment.

FIG. 5 shows an example of a subgraph structure displayed in S310 of the present embodiment. As shown in FIG. 5, as a subgraph structure, the control section 106 makes the display processing section 108 display, in a single display region 110 of a display screen, a node A set as a center of the subgraph structure, and a node B, a node C, a node D, a node E, a node F, and a node G which are located within a distance of two edges from the node A, and also display an edge AB (representing an edge connecting the node A and the node B, and the same hereinafter), an edge AC, an edge AD, an edge AE, an edge BC, an edge BF, an edge CF, and an edge CG.

As shown in FIG. 5, the control section 106 may display, as a subgraph structure, edges extending from the nodes included in the single display region 110 (edges extending from the node F and the node G) to the other nodes which are not displayed in the single display region 110.

The control section 106 distinguishably displays a center element (node A in FIG. 5) of the subgraph structure. For example, the control section 106 may emphatically display the center element in such a manner of enlarging the center element, thickening the outline of the center element, representing the outline with a double line or a dotted line, and/or coloring the center element.

The control section 106 displays display mode icons 170 outside the single display region 110. The control section 106 displays the display mode icons 170 so that the present display mode (normal mode in FIG. 5) can be distinguished.

In the display screen, the control section 106 displays, outside the single display region 110, the history display region 180 in a size smaller than the size of the single display region 110. As a history, the control section 106 displays, in the history display region 180, a history image formed by reducing or simplifying the subgraph structure currently displayed in the single display region 110.

The control section 106 displays a cursor 150 on the display screen, and the operation input section 102 receives a user's operation via the cursor 150. For example, as shown in FIG. 5, when the operation input section 102 receives a mouse click operation in the state where the cursor 150 is overlapped with the node C, the control section 106 determines in S320 that the node C is selected as an element, and advances the processing to S330.

Figure 6:
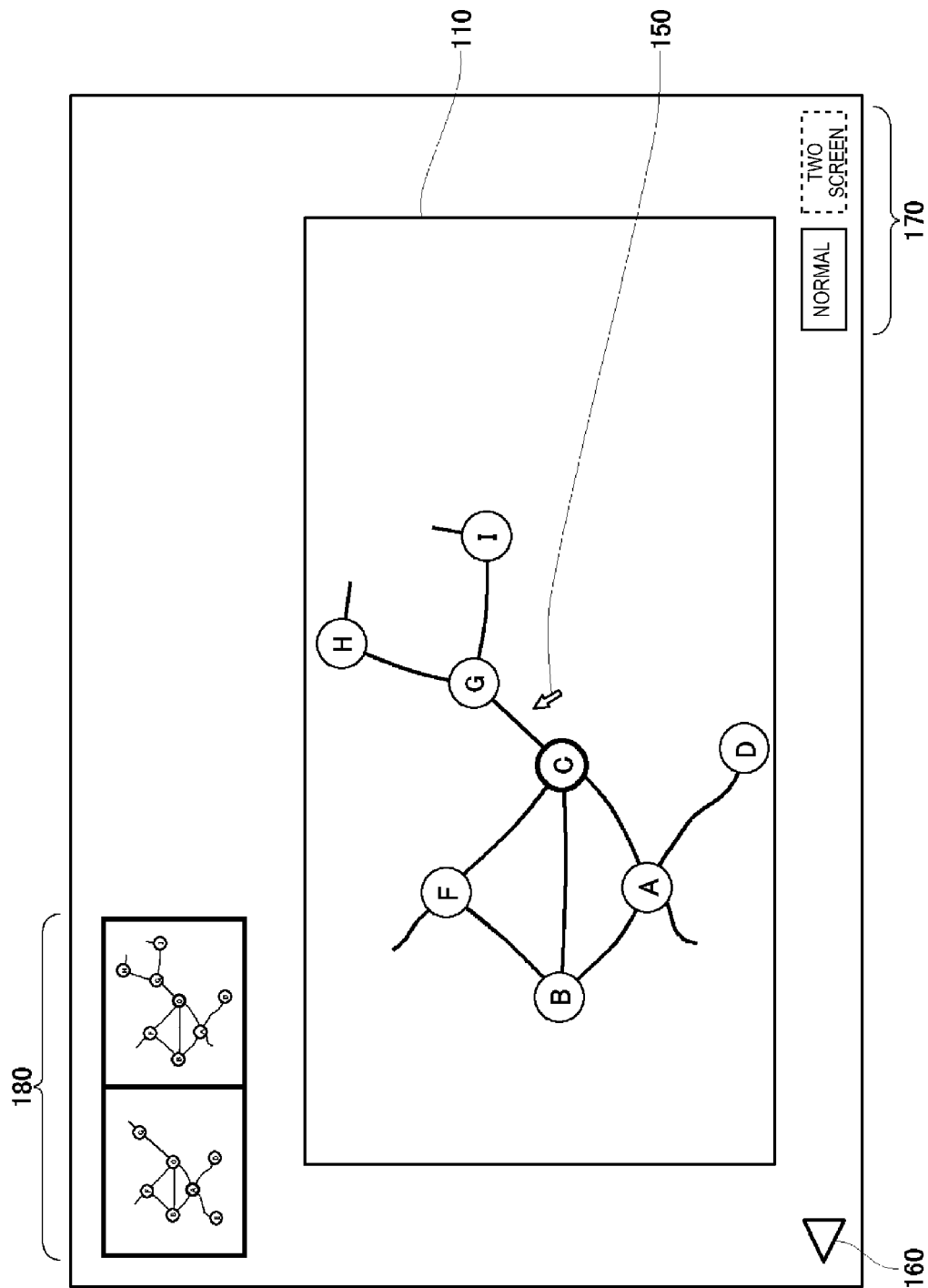
FIG. 6 shows an example of a subgraph structure displayed in S330 of the present embodiment.

FIG. 6 shows an example of a subgraph structure displayed in S330 of the present embodiment. In S330, in response to the selection of the node C shown in FIG. 5, the control section 106 takes the node C as a center element so as to display a subgraph structure configured by elements located within a predetermined distance from the node C. Here, similarly to FIG. 5, the control section 106 distinguishably displays the center element of the subgraph structure (node C in FIG. 6).

In the history display region 180, the control section 106 displays, side by side, history images formed by reducing or simplifying the subgraph structures that have been displayed up to the present time, and a history image formed by reducing or simplifying a subgraph structure currently displayed in the single display region 110. For example, as shown in FIG. 6, the control section 106 displays, on the left side of the history display region 180, the history image according to the subgraph structure shown in FIG. 5, and additionally displays, on the right side of the history display region 180, the history image according to the currently displayed subgraph structure. Further, the control section 106 displays a mark 160 for returning the display on the display screen to the outside of the single display region 110.

In FIG. 6, the operation input section 102 may receive an operation for selecting a history via the cursor 150. For example, when the operation input section 102 receives a mouse click operation in the state where the cursor 150 is overlapped with the return mark 160 or the left history image in the history display region 180, the control section 106 determines in S340 that the history is selected, and displays, in S350, the subgraph structure according to FIG. 5 in the single display region 110. Alternatively, in response to reception of input of a shortcut key, or the like, the control section 106 may perform the processing for returning the display screen.

The control section 106 may switch the display mode when receiving an operation for switching the display mode. For example, when the operation input section 102 receives a mouse click input operation in the state where the cursor 150 is overlapped with "two screen mode" of the display mode icon 170, the control section 106 determines in S40 that a mode switching operation is inputted, and advances the processing to S50 via S10 and S20. Alternatively, the control section 106 may perform processing for switching the display mode when receiving an input of a shortcut key, or the like.

Figure 7:
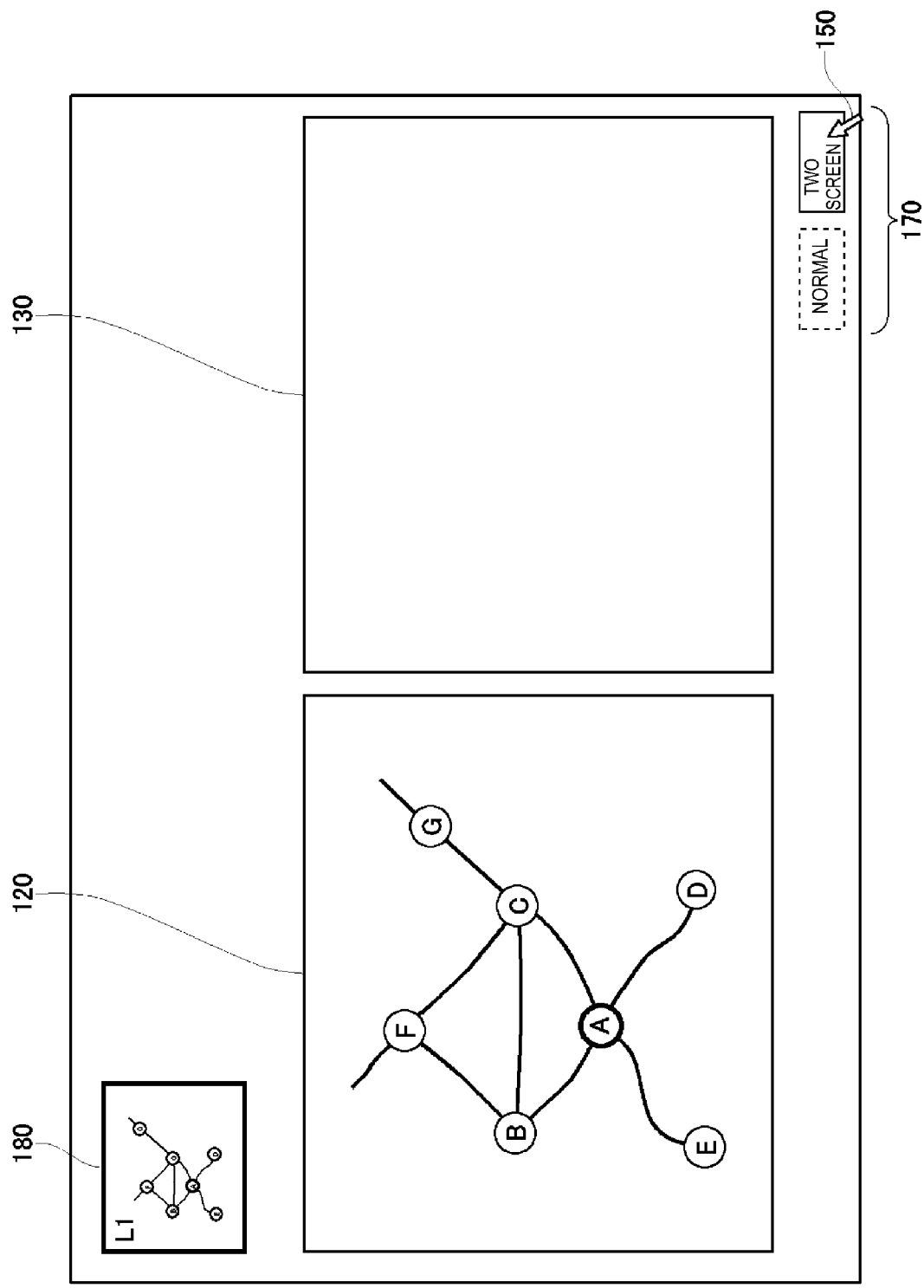
FIG. 7 shows an example of a subgraph structure displayed in S512 of the present embodiment.

FIG. 7 shows an example of a subgraph structure displayed in S512 of S50 of the present embodiment. As shown in FIG. 7, as a subgraph structure, the control section 106 makes the display processing section 108 display, in the first display region 120 of the display screen, a subgraph structure the same as the subgraph structure shown in FIG. 5.

For example, as a subgraph structure, the control section 106 makes the display processing section 108 display, in the first display region 120 of the display screen, the node A set as a center of the subgraph structure, and the node B, the node C, the node D, the node E, the node F, and the node G (which are located within a distance of, for example, two edges from the node A), and also display the edge AB (representing an edge connecting the node A and the node B, and the same hereinafter), the edge AC, the edge AD, the edge AE, the edge BC, the edge BF, the edge CF, and the edge CG.

Since it is considered that the first display region 120 is smaller than the single display region 110, the control section 106 may make the first distance shorter than the distance for displaying the subgraph structure in the normal mode, so that the extent of the subgraph structure displayed in the first display region 120 is set to be smaller than the extent of the single display region 110.

The control section 106 may display, as the subgraph structure, edges extending from the node included in the first display region 120 (edges extending from the node F and the node G) to the other nodes which are not displayed in the first display region 120.

The control section 106 distinguishably displays a center element (node A in FIG. 7) of the subgraph structure. For example, the control section 106 may emphatically display the center element in such a manner of enlarging the center element, thickening the outline of the center element, representing the outline with a double line or a dotted line, and/or coloring the center element.

The control section 106 displays, on the display screen, the second display region 130 at a position adjacent to the first display region 120. Alternatively, the control section 106 may display the first display region 120 and the second display region 130 so that the first display region 120 and the second display region 130 overlap with each other. The control section 106 displays no subgraph structure in the second display region 130 in FIG. 7.

The control section 106 displays the display mode icons 170 outside the first display region 120 and the second display region 130. The control section 106 displays the display mode icons 170 so that the present display mode (two screen mode in FIG. 7) can be distinguished.

Outside the first display region 120 and the second display region 130 on the display screen, the control section 106 displays the history display region 180 in a size smaller than the size of the first display region 120 and the second display region 130. As a history, the control section 106 displays, in the history display region 180, a history image L1 formed by reducing or simplifying the subgraph structure currently displayed in the first display region 120. Further, the control section 106 displays the mark 160 for returning the display on the display screen to the outside of the first display region 120 and the second display region 130.

The control section 106 displays the cursor 150 on the display screen, and the operation input section 102 receives a user's operation via the cursor 150. For example, when the operation input section 102 receives a mouse click input operation in the state where the cursor 150 is overlapped with the node G, the control section 106 determines in S514 that the node G is selected as a first element, and advances the processing to S516.

Figure 8:
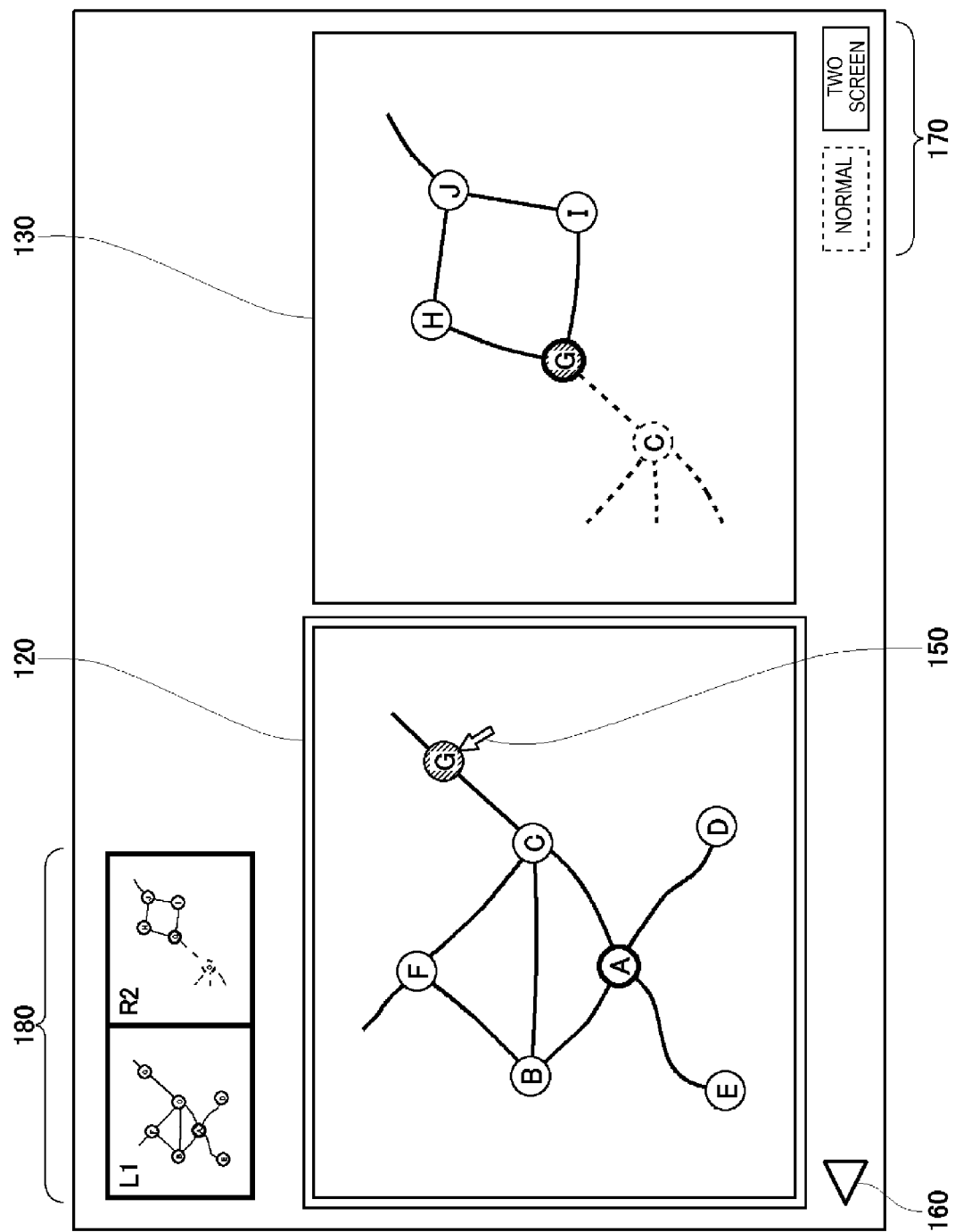
FIG. 8 shows an example of a subgraph structure displayed in S516 of the present embodiment.

FIG. 8 shows an example of a subgraph structure displayed in S516 of the present embodiment. In response to the node G of the subgraph structure shown in FIG. 7 being selected as the first element in S514, the control section 106 displays, in the second display region 130, a subgraph structure including the node G, elements (a node H, a node I, a node J, an edge GH, an edge GI, an edge HJ, and an edge IJ) which are located within a first distance (distance of two edges in FIG. 8) from the node G and which are not displayed in the first display region 120, and the elements (the node C and the edge CG) which are located from the node G within a second distance (distance of one edge in FIG. 8) shorter than the first distance and which are displayed in the first display region 120.

Here, similarly to FIG. 7, the control section 106 displays the center element (node G) in the second display region 130 in a distinguishable manner by thickening the character. The control section 106 displays the first elements (nodes G) respectively displayed in the first display region 120 and the second display region 130 respectively with different colors, or the like, so that the elements can be distinguished from each other. Further, the control section 106 distinguishably displays, with a dotted line, or the like, the elements which are included in the elements displayed in the second display region 130, and which are other than the first element and also displayed in the first display region 120.

In addition to the history image L1 displayed in the history display region 180, the control section 106 displays a history image R2 formed by reducing or simplifying the subgraph structure currently displayed in the second display region 130 so that the history image R2 is arranged side by side with the history image L1. Further, the control section 106 displays the mark 160 for returning the display on the display screen to the outside of the first display region 120 and the second display region 130.

Further, the control section 106 distinguishably displays, on the display screen, one of the first display region 120 and the second display region 130, from which one the first element or the second element was selected most lately. For example, in FIG. 8, in response to the first element of the first display region 120 being selected most lately, the control section 106 emphatically displays the outer frame of the first display region 120 by using a double line. Alternatively, the control section 106 may display the first display region 120 or the second display region 130 by thickening the outer frame of the first display region 120 or the second display region 130, changing the background color of the first display region 120 or the second display region 130, and/or changing the shape of the cursor 150 in the first display region or the second display region 130.

In FIG. 8, the operation input section 102 may further receive an operation for selecting, as a first element, an element other than the node G in the first display region 120 via the cursor 150. For example, when the operation input section 102 receives a mouse click operation in the state where the cursor 150 is overlapped with the node F, the control section 106 determines in S518 that a first element of the first display region 120 is selected, and displays another subgraph structure in the second display region 130 in S520.

Figure 9:
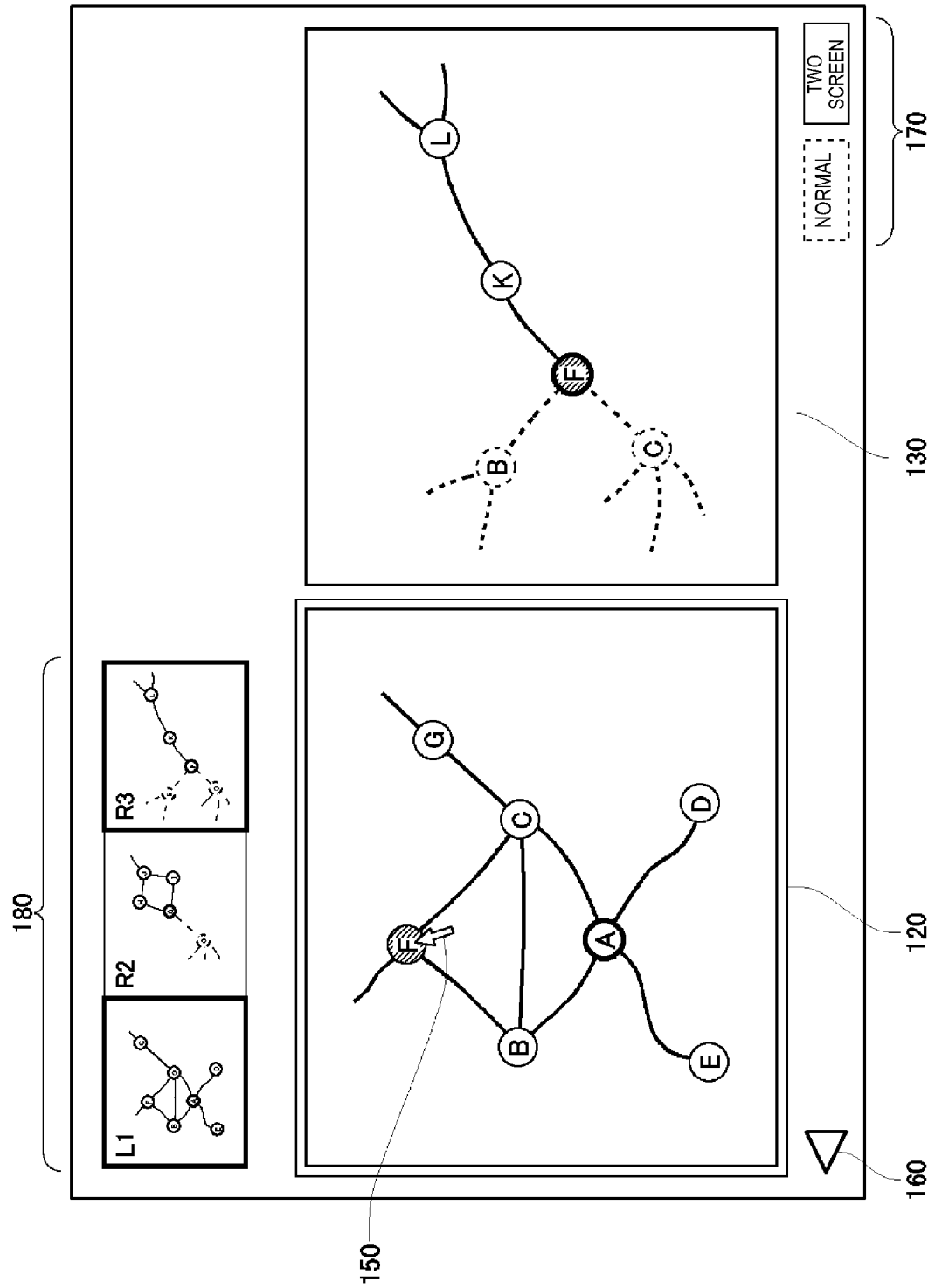
FIG. 9 shows an example of a subgraph structure displayed in S520 of the present embodiment.

FIG. 9 shows an example of a subgraph structure displayed in S520 of the present embodiment. In response to the node F of the subgraph structure shown in FIG. 8 being selected as the first element in S518, the control section 106 displays, in the second display region 130, a subgraph structure including the node F, elements (a node K, a node L, an edge FK, and an edge KL) which are located within the first distance from the node F and which are not displayed in the first display region 120, and elements (the node B, the node C, the edge BF and the edge CF) which are located from the node F within the second distance shorter than the first distance and which are displayed in the first display region 120.

In addition to the history images L1 and R2 displayed in the history display region 180, the control section 106 displays a history image R3 formed by reducing or simplifying the subgraph structure newly displayed in the second display region 130, so that the history image R3 is arranged side by side with the history images L1 and R2. Here, the control section 106 may display the history image L1 and the history image R3 respectively corresponding to the subgraph structures currently displayed in the first display region 120 and the second display region 130, in such a manner that the history image L1 and the history image R3 can be distinguished from the other history image of the history image R2. For example, the control section 106 may display the outer frame of the history image L1 and history image R3 by a thick solid line. Further, the control section 106 displays the mark 160 for returning the display on the display screen to the outside of the first display region 120 and the second display region 130.

In FIG. 9, the operation input section 102 may receive an operation for selecting a second element from the subgraph structure in the second display region 130 via the cursor 150. For example, when the operation input section 102 receives a mouse click operation in the state where the cursor 150 is overlapped with the node L, the control section 106 determines in S522 that a second element of the second display region 120 is selected, and displays another subgraph structure in the first display region 120 in S524.

Figure 10:
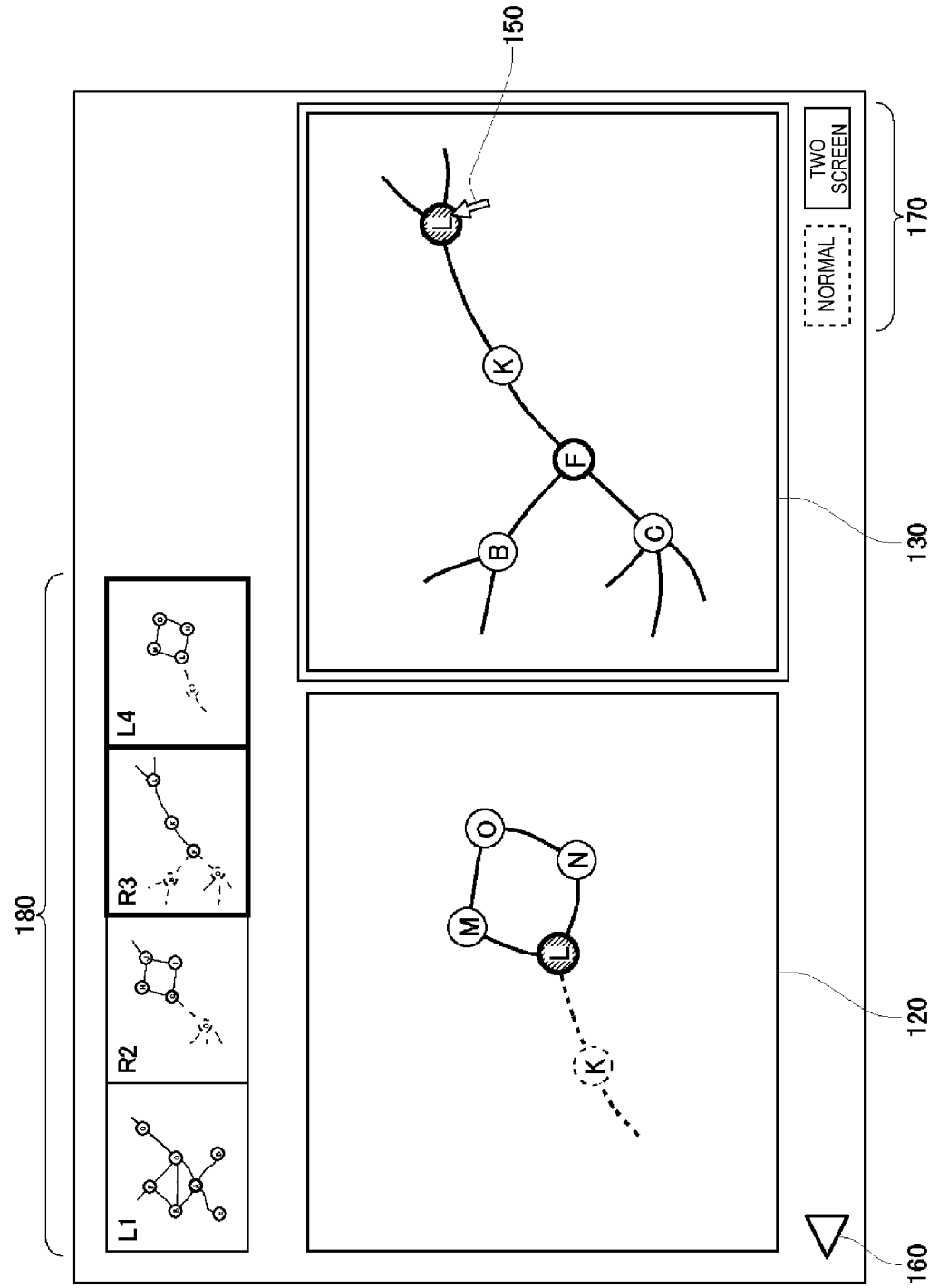
FIG. 10 shows an example of a subgraph structure displayed in S524 of the present embodiment.

FIG. 10 shows an example of a subgraph structure displayed in S524 of the present embodiment. In response to the node L of the subgraph structure shown in FIG. 9 being selected as the second element in S518, the control section 106 displays, in the first display region 120, a subgraph structure which includes the node L, elements (a node M, a node N, a node O, an edge LM, an edge LN, an edge MO, and an edge NO) which are located within the first distance from the node L and which are not displayed in the second display region 130, and elements (the node K, and the edge KL) which are located from the node L within the second distance shorter than the first distance and which are displayed in the second display region 130.

In addition to the history images L1, R2 and R3 displayed in the history display region 180, the control section 106 displays a history image L4 formed by reducing or simplifying the subgraph structure newly displayed in the first display region 120, in such a manner that the history image L4 is arranged side by side with the history images L1, R2 and R3. Here, the control section 106 may display the history image L4 and the history image R3 respectively corresponding to the subgraph structures currently displayed in the first display region 120 and the second display region 130, in such a manner that the history image L4 and the history image R3 can be distinguished from the other history images of the history image L1 and the history image R1. For example, the control section 106 may display the outer frame of the history image L4 and history image R3 by a thick solid line. Further, the control section 106 displays the mark 160 for returning the display on the display screen to the outside of the first display region 120 and the second display region 130.

In response to the input operation for returning the display of the display screen, the control section 106 may return at least a part of the display contents to the display contents immediately before the selection of the first element or the second element, so as to display the returned display contents. For example, when the operation input section 102 receives a mouse click input operation in the state where the cursor 150 is overlapped with the mark 160, the control section 106 determines that a history is selected in S526, and returns the display contents of one or both of the first display region 120 and the second display region 130 to the display contents immediately before the selection of the first element or the second element, so as to display the returned display contents. Alternatively, the control section 106 may perform processing of receiving an input of a shortcut key, and the like, so as to return the display screen.

Figure 11:
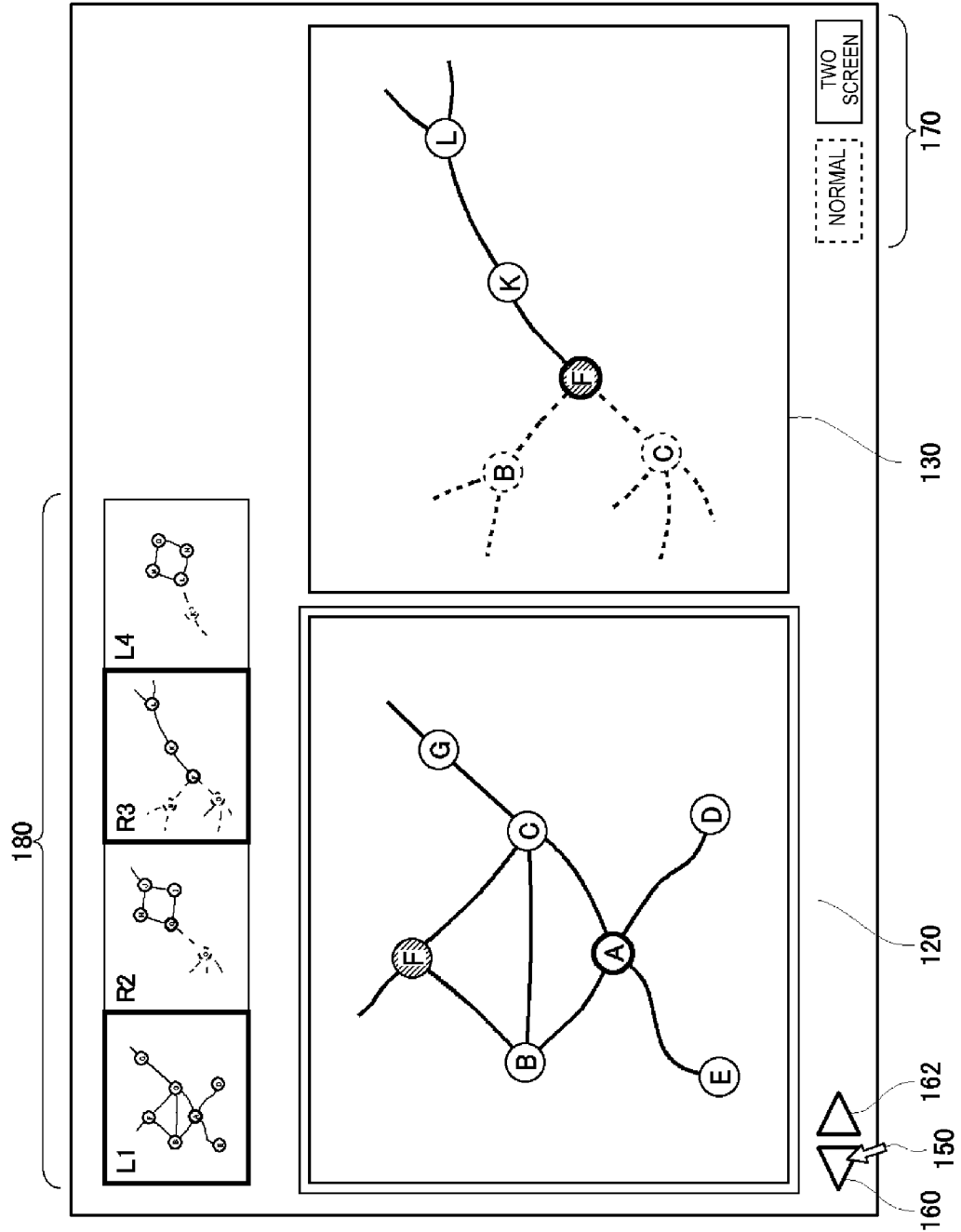
FIG. 11 shows an example of a subgraph structure displayed in S528 of the present embodiment.

FIG. 11 shows an example of a subgraph structure displayed in S528 of the present embodiment. In response to the input operation of the return mark 160 for returning the display of the display screen, the control section 106 selects, from the first display region 120 and the second display region 130, the first display region 120 whose display contents have been changed immediately before the input operation of the return mark 160, and returns the display contents of the first display region 120 to the display contents immediately before the input operation of the return mark 160, so as to display the returned display contents.

In response to the selection of the history image R3 in the history display region 180 instead of the operation of the return mark 160 for returning the display of the display screen, the control section 106 may return the display contents of the first display region 120 to the subgraph structure (subgraph structure corresponding to the history image L1) displayed at the time when the subgraph structure corresponding to the history image R3 was displayed in the second display region 130, and display the returned display contents. Thereby, the control section 106 displays the subgraph structures the same as the subgraph structures of FIG. 9 in the first display region 120 and the second display region 130.

Further, the control section 106 may display an advance mark 162 at a position adjacent to the return mark 160. In response to reception of advance operation by the advance mark 162, the control section 106 may advance the display contents of one or both of the first display region 120 and the second display region 130.

Figure 12:
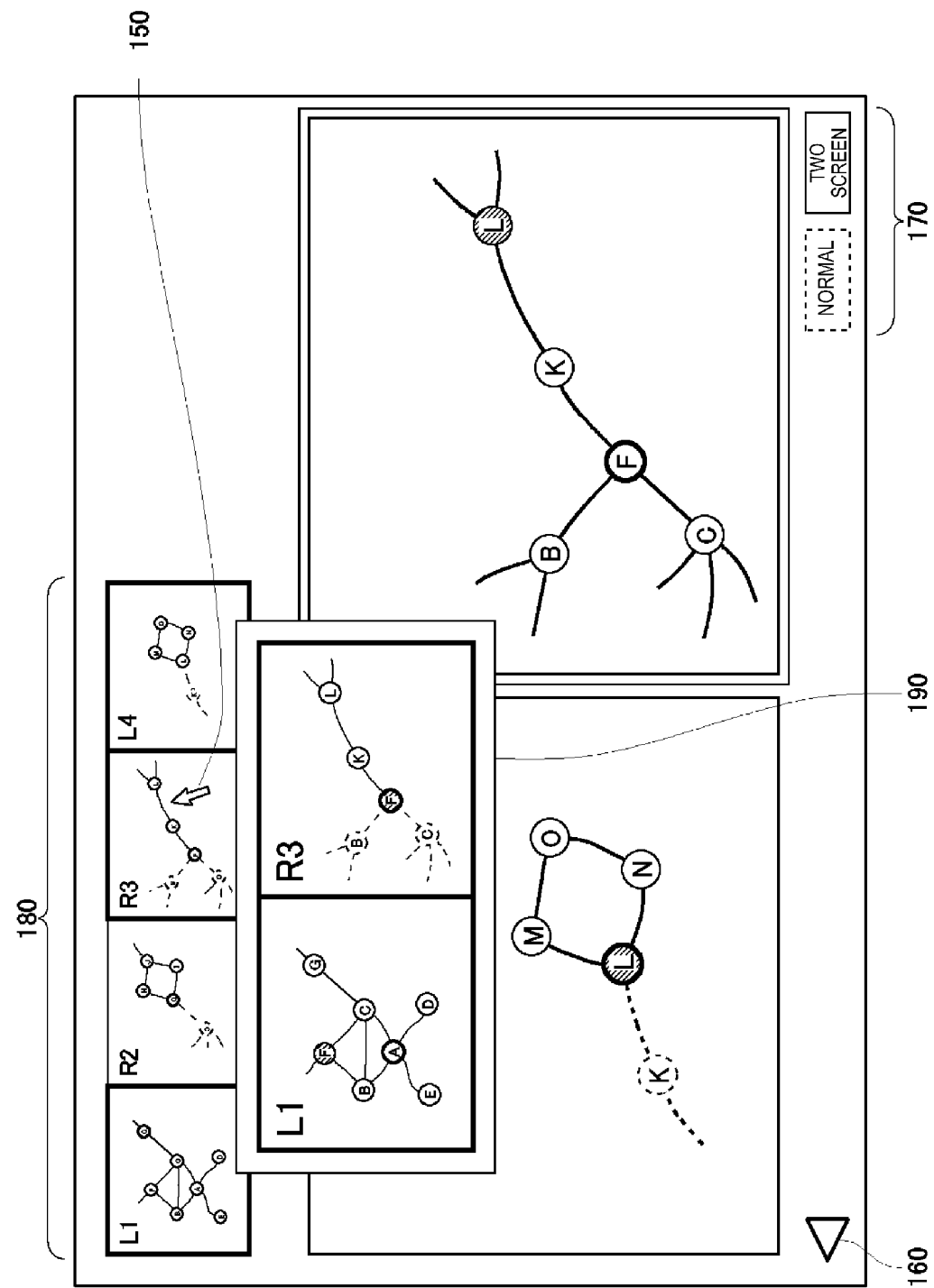
FIG. 12 shows another example of the subgraph structure displayed in S528 of the present embodiment.

FIG. 12 shows another example of the subgraph structure displayed in S528 of the present embodiment. In response to that the operation input section 102 has received input operation for selecting, by the cursor 150, one of the plurality of histories displayed in the history display region 180, the control section 106 displays, on the display screen, the display contents corresponding to the selected history.

When the operation input section 102 receives input operation performed by making the cursor 150 overlap with the history image R3 in the history display region 180, the control section 106 determines in S526 that the history image R3 is selected. In S528, the control section 106 displays, in a history enlargement region 190, an enlarged image of the history image R3, and an enlarged image of the history image L1 which was displayed on the first display region 120 simultaneously with the history image R3.

Here, when the operation input section 102 further receives a mouse click input operation in the state where the cursor 150 is overlapped with the history enlargement region 190, the control section 106 may display, in the first display region 120, the subgraph structure corresponding to the history image L1, and display, in the second display region 130, the subgraph structure corresponding to the history image R3.

The control section 106 may perform display in such a manner that the history image L4 and the history image R3 respectively corresponding to the subgraph structures currently respectively displayed in the first display region 120 and the second display region 130, and the history image L1 and the history image R3 respectively displayed in the history enlargement region 190 can be distinguished from the other history image of the history image R2. For example, the control section 106 may display the outer frame of each of the history image L1, the history image L4, and the history image R3 by a thick solid line.

Figure 13:
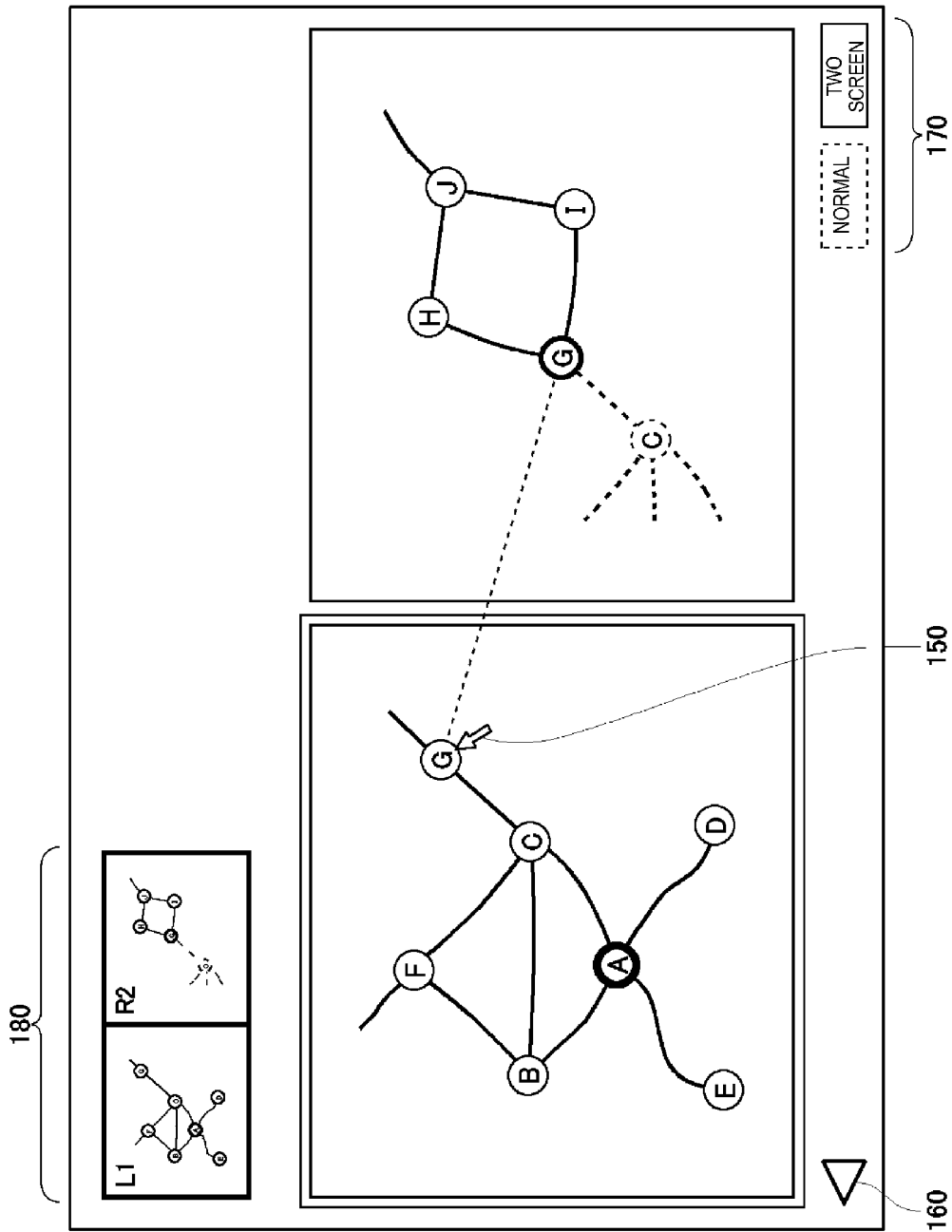
FIG. 13 shows another example of the subgraph structure displayed in S516 of the present embodiment.

FIG. 13 shows another example of the subgraph structure displayed in S516 of the present embodiment. In FIG. 13, the control section 106 respectively displays, in the first display region 120 and the second display region 130, the subgraph structures the same as the subgraph structures of FIG. 8. In FIG. 13, the control section 106 may display, in the display screen, display information which associates the elements with each other, the elements being the same as each other and respectively displayed in the first display region 120 and the second display region 130. For example, as shown in FIG. 13, the control section 106 may connect, by a line segment, the node G displayed in the first display region 120 to the node G displayed in the second display region 130.

In the above description of the present embodiment, the control section 106 of the display device 10 makes the display processing section 108 display a subgraph structure in one or two display regions, but may make the display processing section 108 display a subgraph structure in three or more display regions.

Further, when predetermined conditions are satisfied, the control section 106 of the display device 10 may replace the subgraph structure of the first display region 120 and the subgraph structure of second display region 130 with each other, or may replace, on the display screen, the position of the first display region 120 and the position of the second display region 130 with each other. For example, when the second element of the subgraph structure in the second display region 130 is selected in the processing of S522, the control section 106 may replace the subgraph structure displayed in the first display region 120 with the subgraph structure displayed in the second display region 130 at the same time when updating the subgraph structure of the first display region 120. Thereby, the subgraph structure including the element most lately selected is always displayed in the first display region 120, and hence the user can easily recognize the subgraph structure to which latest attention has been given.

Further, for example, when, in the processing of S514 and/or S518, an element located, by more than a predetermined range, on the side (the left side in the example of FIGS. 8 and 9) opposite to the second display region 130 is selected, as a first element, from the elements of the subgraph structure in the first display region 120, the control section 106 may replace the subgraph structure displayed in the first display region 120 with the subgraph structure displayed in the second display region 130 at the same time when updating the subgraph structure in the second display region 130.

Further, similarly, when, in the processing of S522, an element located, by more than a predetermined range, on the side (the right side in the example of FIGS. 8 and 9) opposite to the first display region 120 is selected, as a second element, from the elements of the subgraph structure in the second display region 130, the control section 106 may replace the subgraph structure displayed in the first display region 120 with the subgraph structure displayed in the second display region 130 at the same time when updating the subgraph structure in the first display region 120.

Thereby, for example, when the user selects, as a second element, an element on the left side of the first display region 120, the display device 10 displays, in the left display region, the subgraph structure having the second element. Therefore, the display device 10 displays first/second elements, selected in the first display region 120 and the second display region 130, at positions close to each other on the display screen, and thereby the relationship between the subgraph structures of both the display regions can be displayed so as to be easily recognized.

Further, as illustrated in FIG. 7, and the like, the display processing section 108 of the display device 10 may display the first display region 120 and the second display region 130 so that the shape of the second display region 130 becomes the same as the shape of the first display region 120. Alternatively, the display processing section 108 may display the first display region 120 and the second display region 130 so that the size of the second display region 130 becomes different from the size of the first display region 120. For example, the display processing section 108 may display the first display region 120 and the second display region 130 by enlarging one of the first display region 120 and the second display region 130, the one having an element most lately selected or having a subgraph structure most lately updated.

Further, in the normal mode and the two screen mode, instead of directly receiving a selected element, the control section 106 may select an element in the subgraph structure displayed in the single display region 110, the first display region 120, or the second display region 130 according to an operation of dragging an arbitrary point in these regions by a hand tool, or the like.

For example, when receiving an operation of dragging a point in the single display region 110, the first display region 120, and the second display region 130, and moving the point in a first direction, the control section 106 may select an element which is included in the elements of a subgraph structure displayed in each of the regions, and which is located on the side opposite to the first direction.

For example, in S320, in response to that the operation input section 102 has received an operation of dragging an arbitrary point in the single display region 110 by a mouse, or the like, to move the point in a lower left direction, or has received an operation of flicking or swiping an arbitrary point in the single display region 110 on a touch panel, the control section 106 may select an element existing at a rightmost and uppermost position in the subgraph structure displayed in the single display region 110. Here, the control section 106 may emphatically display an element currently selected by an operation of dragging, flicking or swiping, and may select an element to be emphatically displayed, in response to input of an element selection determination operation (for example, a drop operation corresponding to a drag operation, an operation of releasing finger from a touch panel during a flicking or swiping operation, or the like). Thereby, the control section 106 can give the user, operation feeling that the user intuitively moves the subgraph structure in the single display region 110 by using a user interface (UI), such as a hand tool.

Figure 14:
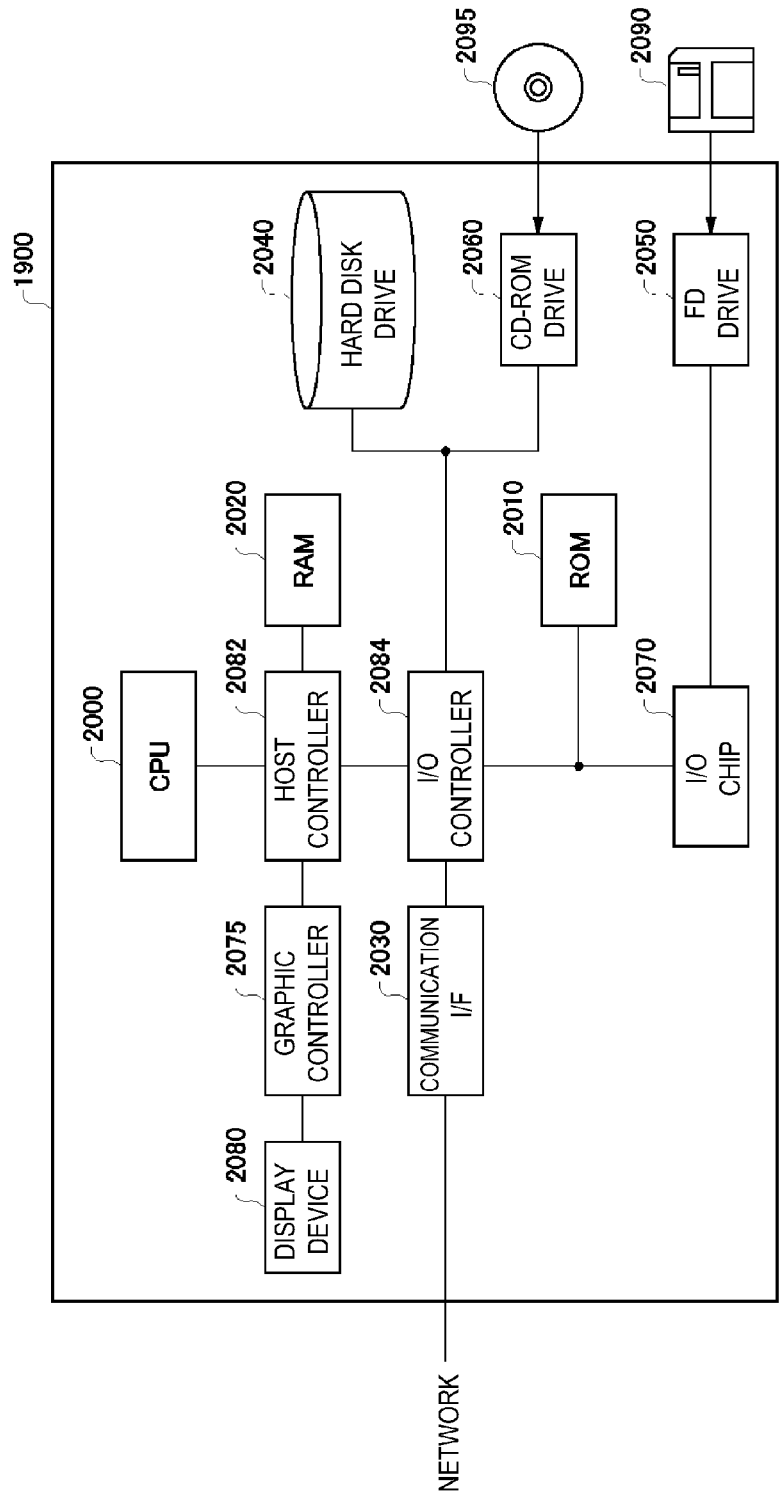
FIG. 14 shows an example of a hardware configuration of a computer 1900.

FIG. 14 shows an example of a hardware configuration of the computer 1900 which functions as the display device 10. The computer 1900 according to the present embodiment includes: a CPU peripheral section including a CPU 2000, a RAM 2020, a graphic controller 2075, and a display device 2080 which are connected to each other by a host controller 2082; an input/output section including a communication interface 2030, a hard disk drive 2040, and a CD-ROM drive 2060, which are connected to the host controller 2082 by an input/output controller 2084; and a legacy input/output section including a ROM 2010, a flexible disk drive 2050, and an input/output chip 2070, which are connected to the input/output controller 2084.

The host controller 2082 connects the RAM 2020 to the CPU 2000 and the graphic controller 2075 which access the RAM 2020 at a high transfer rate. The CPU 2000 operates on the basis of a program stored in the ROM 2010 and the RAM 2020, so as to perform control of each section.

The graphic controller 2075 acquires image data created by the CPU 2000, and the like, on a frame buffer provided in the RAM 2020 and displays the image data on the display device 2080. Alternatively, the graphic controller 2075 may incorporate a frame buffer for storing the image data created by the CPU 2000, and the like.

The input/output controller 2084 connects the host controller 2082 to the communication interface 2030, the hard disk drive 2040, and the CD-ROM drive 2060, which are input/output devices having a relatively high speed. The communication interface 2030 performs communication with other devices via a wired or wireless network.

Further, the communication interface functions as hardware which performs communication in the display device 10. The hard disk drive 2040 stores a program and data which are used by the CPU 2000 in the computer 1900. The CD-ROM drive 2060 reads a program or data from a CD-ROM 2095, and provides the program or data to the hard disk drive 2040 via the RAM 2020.

Further, the input/output controller 2084 is connected to relatively low speed input/output devices of the ROM 2010, the flexible disk drive 2050, and the input/output chip 2070. The ROM 2010 stores a boot program executed by the computer 1900 at the startup time, and/or a program, and the like, depending on the hardware of the computer 1900.

The flexible disk drive 2050 reads a program or data from a flexible disk 2090, and provides the program or data to the hard disk drive 2040 via the RAM 2020. The input/output chip 2070 connects the flexible disk drive 2050 to the input/output controller 2084, and connects various input/output devices to the input/output controller 2084, for example, via a parallel port, a serial port, a keyboard port, a mouse port, and the like.

The program provided to the hard disk drive 2040 via the RAM 2020 is stored in a recording medium, such as the flexible disk 2090, the CD-ROM 2095, or an IC card, which is provided by the user. The program is read from the recording medium and is installed in the hard disk drive 2040 in the computer 1900 via the RAM 2020, so as to be executed by the CPU 2000.

The programs which are installed in the computer 1900 and which make the computer 1900 operate as the display device 10, include an operation input module, a history acquisition module, a control module, and a display processing module. The programs or the modules may be executed by the CPU 2000, and the like, so as to make the computer 1900 function as the operation input section 102, the history acquisition section 104, the control section 106, and the display processing section 108.

When the programs are read into the computer 1900, the information processes described in the programs respectively function as the operation input section 102, the history acquisition section 104, the control section 106, and the display processing section 108 which are specific means configured by cooperation between the software and various kinds of the above-described hardware resources. Further, arithmetic operation or processing of information corresponding to the use purpose of the computer 1900 in the present embodiment is realized by the specific means, to thereby realize the display device 10 corresponding to the use purpose.

For example, when performing communication between the computer 1900 and an external apparatus, and the like, the CPU 2000 executes the communication program loaded in the RAM 2020. On the basis of the processing contents described in the communication program, the CPU 2000 instructs the communication interface 2030 to perform communication processing.

Under the control of the CPU 2000, the communication interface 2030 reads transmission data stored in a transmission buffer area, or the like, provided in a storage device, such as the RAM 2020, the hard disk drive 2040, the flexible disk 2090, or the CD-ROM 2095, so as to transmit the read transmission data to the network, or writes reception data received from the network in a reception buffer area, or the like, provided in the storage device.

In this way, the communication interface 2030 may perform transfer of transmission and reception data to and from the storage device by a DMA (Direct Memory Access) method. Alternatively, transfer of transmission and reception data may be performed in such a manner that the CPU 2000 reads data from a transfer source of the storage device or the communication interface 2030 and writes the data in a transfer destination of the communication interface 2030 or the storage device.

Further, by a DMA transfer method, or the like, the CPU 2000 reads, into the RAM 2020, all or a required portion of a file, a database, or the like, stored in an external storage device, such as the hard disk drive 2040, the CD-ROM drive 2060 (CD-ROM 2095), and the flexible disk drive 2050 (flexible disk 2090), and performs various kinds of processing to data held in the RAM 2020.

Further, the CPU 2000 writes back the processed data to the external storage device by the DMA transfer method, or the like. In the above-described processing, the RAM 2020 is regarded as a device for temporarily holding the contents of the external storage device, and hence in the present embodiment, the RAM 2020, the external storage device, or the like, is generally referred to as a memory, a storage section, a storage device, or the like.

In the present embodiment, various kinds of information, such as various programs, data, tables, databases, and the like, are stored in the storage devices described above, so as to become objects to be processed. It should be noted that the CPU 2000 can hold a part of the contents of the RAM 2020 in a cache memory, so as to perform write/read processing into/from the cache memory. Also, in this configuration, the cache memory performs a part of the functions of the RAM 2020, and hence also in the present embodiment, the cache memory is assumed to be included in the RAM 2020, the memory, and/or the storage device, except for the case where the cache memory is distinguished from the RAM 2020, the memory and/or the storage device.

Further, the CPU 2000 applies, to the data read from the RAM 2020, various kinds of processing which are instructed by instruction sequences of programs and which include various kinds of arithmetic operation, processing of information, conditional determination, search and replace of information, and the like, that are described in the present embodiment. Then, the CPU 2000 writes back the processed data to the RAM 2020. For example, in the case of performing conditional determination processing, the CPU 2000 determines whether or not each of various variables shown in the present embodiment satisfies a condition of being larger, smaller, more, less, or equal, by comparing the variable with each of the other variables or constants. When the conditions are satisfied (or when the conditions are not satisfied), the CPU 2000 branches to a different instruction sequence, or calls a subroutine.

Further, the CPU 2000 can retrieve information stored in a file, a database, or the like, in the storage device. For example, in the case where a plurality of entries, in each of which an attribute value of a second attribute is made to correspond to an attribute value of a first attribute, are stored in a storage device, the CPU 2000 retrieves, from the plurality of entries stored in the storage device, an entry whose attribute value of the first attribute coincides with a specified condition, and then reads the attribute value of the second attribute stored in the entry. Thereby, the CPU 2000 can obtain an attribute value of a second attribute made to correspond to a first attribute satisfying a predetermined condition.

The programs or modules described above may be stored in an external recording medium. As the recording medium, it is possible to use optical recording media such as DVD or CD, optical magnetic recording media such as MO, tape media, semiconductor memories such as an IC card, and the like, other than the flexible disk 2090 and the CD-ROM 2095. Further, a storage device, such as a hard disk or a RAM, provided in a server system connected to a dedicated communication network or Internet, may be used as the recording medium, so as to provide a program stored in the storage device to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the above, the present invention has been described on the basis of the embodiment, but the scope of the invention is not limited to the scope of the embodiment described above. It is apparent to those skilled in the art that various modifications or changes can be made in the embodiment described above. It is apparent from the description of the appended claims of the present invention that embodiments with such modifications or changes applied thereto are also included in the technical scope of the present invention.

It should be recognized that the execution order of each process such as the operation, the procedure, the step, and the stage in the device, the system, the program and the method described in the claims, the specification, and the drawings can be realized in an arbitrary order unless particularly stated as "before", "prior", and the like, and as long as the output of the previous process is not used in the subsequent process. In the operation flow of the claims, the specification, and the drawings, the description may be made using "first", "next", and the like for the sake of convenience, but this does not mean that implementation in such order is essential.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claims is:

1. A display device for displaying parts of a graph structure, the graph structure having elements that are connected by edges and the display device comprising:
    a display screen configured for displaying at least a first display region and a second display region positioned adjacent to one side of the first display region;
    a display processing section configured to display in the first display region a first part of the graph structure comprising at least a first element and a second element; and
    a control section configured to cause the display screen to continue to display the first part in the first display region and to simultaneously display in the second display region, responsive to selection of the first element displayed in the first display region, a second part of the graph structure comprising at least the first element and an additional element,
    wherein the first part and the second part are only partially overlapping subgraph structures within the graph structure.

2. The display device according to claim 1, wherein the second element is not in the second part and wherein the additional element is not in the first part.

3. The display device according to claim 1, wherein the displaying in the second display region includes displaying any of the elements in the graph structure that are located within a first distance from the first element, the first distance being defined as a predetermined number of edges.

4. The display device according to claim 1, wherein the displaying in the second display region includes displaying a predetermined number or less of graph structure elements displayed in the first display region.

5. The display device according to claim 3, wherein the displaying in the second display region includes displaying any of the elements in the graph structure that are displayed in the first display region and that are also located within a second distance from the first element, the second distance being equal to or less than the first distance.

6. The display device according to claim 1, wherein the displaying in the first display region includes displaying a graph structure element responsive to receiving a selection of a graph structure element displayed in the second display region.

7. The display device according to claim 6, wherein the control section is configured to indicate one of the display regions for which one of the graph structure elements was most recently received.

8. The display device according to claim 1, wherein the control section is configured to cause the display screen to not display in the second display region one or more elements displayed in the first display region and to not display in the first display region one or more elements displayed in the second display region.

9. The display device according to claim 1, wherein the graph structure elements include nodes and the control section is configured to cause the display screen to display information associating respective ones of the nodes displayed in both the first and second display regions.

10. The display device according to claim 1, further comprising an operation input section configured to receive an operation for returning a display of the display screen,
    wherein the control section is configured to, in response to the operation input section receiving the operation for returning, returning at least a part of the display screen before receiving a next element selection.

11. The display device according to claim 10, wherein the control section is configured to, in response to the operation input section receiving the operation, return display for both the first display region and the second display region before receiving a next element selection.

12. The display device according to claim 1, wherein the display processing section is configured to perform a switching operation for switching between a normal mode for displaying graph structure in only a single display region and a two screen mode for displaying graph structure in both the first display region and the second display region.

13. The display device according to claim 1, further comprising:
a history acquisition section configured to acquire a history of display of at least a part of the graph structure on the display screen,
wherein the display processing section is configured to cause display of the history in a history display region of the display screen.

14. The display device according to claim 13, wherein the history display region is smaller than the first display region and the second display region.

15. The display device according to claim 14, further comprising an operation input section configured to receive user input, wherein the display processing section is configured to cause the history display region to display respective display histories at respective times responsive to user input received via the operation input section.

16. The display device according to claim 1, wherein the display processing section is configured to display the first and second display regions in corresponding shapes.

17. A method of displaying a graph structure, the graph structure having elements that are connected by edges and the display method comprising:
displaying in a first display region of a display screen at least a first part of the graph structure comprising at least a first element and a second element; and
responsive to selection of the first element displayed in the first display region, continuing to display the first part in the first display region and simultaneously displaying, in a second display region that is positioned adjacent to one side of the first display region, a second part of the graph structure comprising at least the first element and an additional element,
wherein the first part and the second part are only partially overlapping subgraph structures within the graph structure.

18. The method of claim 17, wherein the second element is not in the second part, wherein the additional element is not in the first part, and wherein the displaying in the second display region includes displaying any of the elements in the graph structure that are located within a first distance from the first element, the first distance being defined as a predetermined number of edges.

19. A computer program product for displaying a graph structure, the graph structure having elements connected by edges, the computer program product including a computer readable storage medium having instructions stored thereon for execution by a computer, wherein the instructions, when executed by the computer, cause the computer to perform operations comprising:
displaying, in a first display region of a display screen, a first part of the graph structure comprising at least a first element and a second element; and
responsive to selection of the first element displayed in the first display region, continuing to display the first part in the first display region and simultaneously displaying, in a second display region of the display screen, a second part of the graph structure comprising the first element and an additional element,
wherein the first part and the second part are only partially overlapping subgraph structures of the graph structure.

20. The computer program product of claim 19, wherein the second element is not in the second part, wherein the additional element is not in the first part, and wherein the displaying in the second display region includes displaying any of the elements in the graph structure that are located within a first distance from the first element, the first distance being defined as a predetermined number of edges.

* * * * *